United States Patent [19]

Ohmura et al.

[11] 4,135,797
[45] Jan. 23, 1979

[54] SHUTTER LOCK MEANS FOR CAMERAS

[75] Inventors: Hiroshi Ohmura; Hideto Shirane, both of Yokohama, Japan

[73] Assignee: Fuji Photo Film Co., Ltd., Minami-ashigara, Japan

[21] Appl. No.: 769,297

[22] Filed: Feb. 16, 1977

[30] Foreign Application Priority Data

Feb. 17, 1976 [JP] Japan .................................. 51-16420

[51] Int. Cl.² .......................................... G03B 15/05
[52] U.S. Cl. ..................................... 354/128; 354/268
[58] Field of Search ................. 354/127, 128, 268, 33, 354/139, 149

[56] References Cited

U.S. PATENT DOCUMENTS

| | | | |
|---|---|---|---|
| 3,424,071 | 1/1969 | Schioahn | 354/128 |
| 3,439,597 | 4/1969 | Wagner | 354/139 |
| 3,997,815 | 12/1976 | Decker | 354/128X |

Primary Examiner—Michael L. Gellner

Attorney, Agent, or Firm—Fleit & Jacobson

[57] ABSTRACT

When a photographic camera is set to take a picture using a strobo, depression of a shutter release button of the camera is prevented until the charge stored in a capacitor for the strobo reaches a required level to flash a strobo discharge lamp. A shutter lock means includes a mechanical locking lever, an electromagnetic lock releasing means and a control circuit for controlling the electromagnetic lock releasing means. The mechanical locking lever is located at a lock position where it prevents depression of the shutter release button when the camera is set to take a picture using the strobo, and is held in the lock position until the electric charge stored in the capacitor reaches the required level by the attractive force of an electromagnet of the electromagnetic lock releasing means. When the charge has reached the required level, the electromagnet is deenergized and the mechanical locking lever is allowed to move to a release position by a spring force, whereby the depression of the shutter release button is allowed.

1 Claim, 3 Drawing Figures

SHUTTER LOCK MEANS FOR CAMERAS

BACKGROUND OF THE INVENTION

1. Field of the Invention

This invention relates to a shutter lock means for a photographic camera with a strobo, and more particularly to a shutter lock means for a photographic camera which prevents depression of a shutter release button when the camera is set to take a picture using a strobo and a capacitor for a strobo discharge lamp is not charged up to a required level to flash the strobo discharge lamp.

2. Description of the Prior Art

As is well known in the art, a strobo discharge lamp is energized by a very high voltage of electric power. Therefore, in a conventional camera, the voltage taken from a power source is first raised by a transformer and stored in a capacitor and then rapidly introduced into the strobo discharge lamp by means of a trigger switch to flash the lamp. The trigger switch works in response to operation of a shutter release button of the camera. If the shutter release button is depressed before the charge stored in the capacitor has not reached a required level, the strobo discharge lamp will not be flashed and accordingly an under-exposed photograph is taken.

In order to prevent such an accident, conventional cameras are generally provided with an indicating lamp which is lighted when the charge stored in the capacitor has reached the required level.

However, such conventional cameras are not provided with means to prevent the shutter release until the charge stored in the capacitor reaches the required level. Therefore, the conventional camera suffers from the defect that the shutter would sometimes carelessly be released before said charge has reached the required level particularly when more than one picture is successively taken using a strobo.

SUMMARY OF THE INVENTION

Accordingly, it is the primary object of the present invention to provide a shutter lock means for a camera with a strobo which prevents depression of a shutter release button of the camera when the camera is set to take a picture using the strobo and a capacitor for a strobo is not charged up to a required level to flash the strobo discharge lamp.

A shutter lock means in accordance with the present invention includes a mechanical locking means which is made to be engaged with a shutter release lever to prevent depression of a shutter release button when a camera is set to take a picture using a strobo. The mechanical locking means is controlled by an electromagnetic lock releasing means which is in turn controlled by an electric control circuit. The control circuit controls the electromagnetic lock releasing means to move the mechanical locking means to allow the depression of the shutter release button when a capacitor for a strobo is charged up to a required level to flash a strobo discharge lamp.

The electromagnetic lock releasing means may be, for example, comprised of an electric magnet or a permanent magnet having a coil wound therearound. The control circuit supplies power to the electromagnetic lock releasing means or cuts off the supply of power thereto when the charge stored in the capacitor has reached the predetermined level.

The shutter lock means in accordance with the present invention can be employed either in a camera having a built-in strobo discharge lamp or a camera to which a strobo discharge lamp is externally attached by means of an accessory shoe.

DESCRIPTION OF THE PREFERRED EMBODIMENTS

Preferred embodiments of the present invention will hereinbelow be described in detail with reference to FIGS. 1 to 3.

Figure 1:
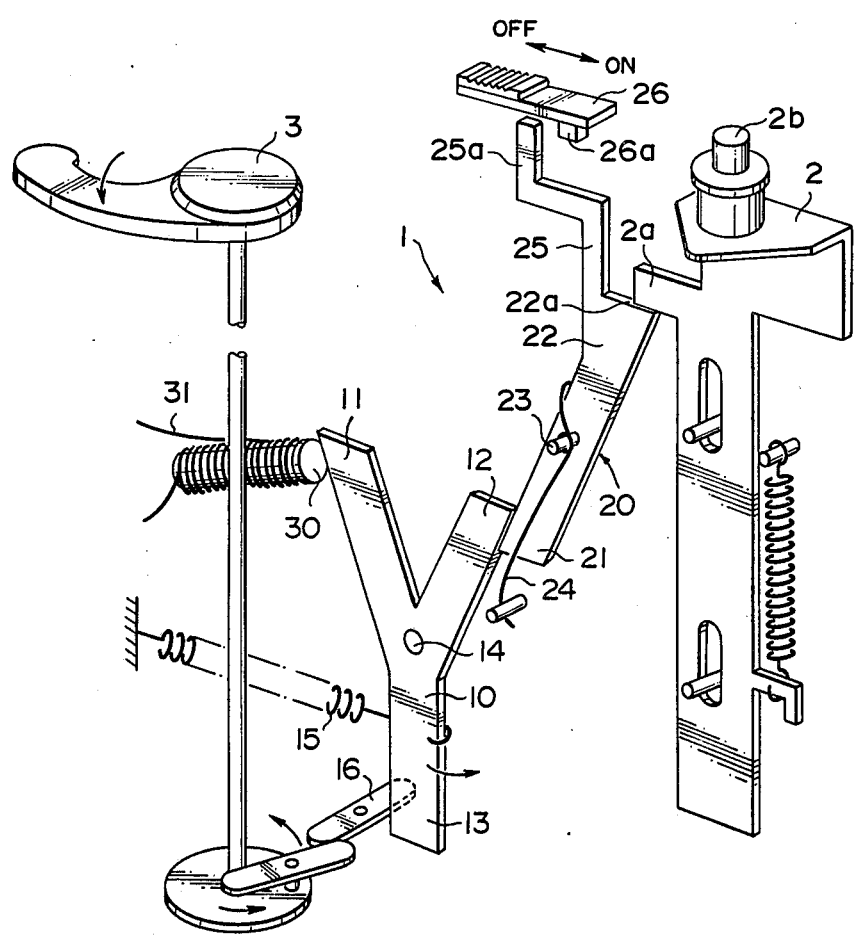
FIG. 1 is a perspective view showing an example of a mechanical locking means associated with an electromagnetic means which is employed in a shutter lock means in accordance with one embodiment of the present invention.

In FIG. 1, a mechanical locking means 1 includes a Y-shaped lever 10 and a shutter lock lever 20 which are rotatably supported in a camera body at intermediate portions thereof on pivot pins 14 and 23, respectively. The Y-shaped lever 10 has first, second and third arms 11, 12 and 13. With the third arm 13 is engaged an end of a tension spring 15 which urges the Y-shaped lever 10 in the clockwise direction. The second arm 12 of the lever 10 abuts against the lower end portion 21 of the shutter lock lever 20. Against the third arm 13 of the Y-shaped lever 10 abuts a reset lever 16 which is to be rotated in the clockwise direction to push the Y-shaped lever 10 in the counterclockwise direction overcoming the force of the spring 15 upon wind up movement of a film wind up lever (shutter lock lever) 3 of the camera.

Said shutter lock lever 20 is urged in the clockwise direction by a spring 24 the force of which is weaker than that of the spring 15. The lever 20 has an engaging portion 22a provided integrally therewith at the upper end 22 thereof which is engaged with a corresponding engaging portion 2a provided on a shutter release member 2 to prevent the downward movement thereof. The shutter lever 2 is movable up and down and is moved downward upon depression of the shutter release button 2b provided on the top thereof and projecting outside the camera body (not shown).

The shutter lock lever 20 is further provided with an upper extension 25 extending upward from the upper end 22 thereof. The upper end 25a of the extension 25 rests adjacent to a projection 26a integrally hanging from the inner face of a change-over button 26. The change-over button 26 is slidable back and forth, and the outer surface thereof is faced outside of the camera body. When the strobo is not used, the button 26 is positioned in the left extreme position and is slid rightward when the strobo is used. When the button 26 is in the left extreme position, the projection 26a thereof is engaged with the upper end 25a of the upper extension 25 of the shutter lock lever 20 to prevent the clockwise rotation of the lever 20. Therefore, the engaging portion 22a of the lever 20 is not engaged with that of the shutter lever 2 and accordingly the shutter button 2a can be depressed downward no matter whether a capacitor for a strobo is charged or not. On the other hand, when the button 26 is slid rightward, the clockwise rotation of the lever 20 is allowed.

Adjacent said first arm 11 of the Y-shaped lever 10 is disposed a permanent magnet 30 which attracts the arm 11 to prevent clockwise rotation of the Y-shaped lever 10 when the lever 10 is brought into contact therewith. Around the magnet 30 is wound a coil 31 which nullifies the permanent magnet 30 when supplied with an electric current. The coil 31 is connected to a control circuit which supplies the electric current thereto when a level of the charge stored in a capacitor for a strobo has reached a required level to flash a strobo discharge lamp as will be descried hereinafter.

When the pictures are to be taken with a strobo, said change-over button is slid to its right extreme position in which said shutter lock lever 20 is allowed to rotate in the clockwise direction. However, the clockwise rotation thereof is still prevented by the abutment of the lower end portion 21 of the shutter lock lever 20 on the second arm 12 of the Y-shaped lever 10, since the force of the spring 15 urging the Y-shaped lever 10 clockwise is stronger than that of the spring 24 urging the shutter lock lever 20 clockwise. When said film wind up lever 3 is operated, the Y-shaped lever 10 is rotated in the counterclockwise direction by way of the reset lever 16 as mentioned above and is held in the position attracted by the magnet 30. Therefore, the shutter lock lever 20 is allowed to be rotated in the clockwise direction by the force of the spring 24. Accordingly, the engaging portion 22a thereof is brought in engagement with the engaging portion 2a of the shutter release lever 2 to prevent the depression of the shutter release button 2b.

When the coil 31 is excited and the permanent magnet 30 is nullified, i.e., the charge stored in the capacitor has reached the required level, the Y-shaped lever 10 is rotated in the clockwise direction by the force of the spring 16. Accordingly, the second arm 12 of the Y-shaped lever 10 pushes the lower end portion 21 of the shutter lock lever 20. Therefore, the shutter lock lever 20 is rotated in the counterclockwise direction to release the engagement between the engaging portion 22a thereof and the engaging portion 2a of the shutter release member 2, since the force of the spring 15 is stronger than that of the spring 24. Thus, the shutter release button 2b can be depressed when the capacitor is completely charged.

Now referring to FIG. 2, an example of a control circuit which supplies said coil 31 with the electric current when the charge stored in the capacitor has reached the required level will be described. In FIG. 2, a conventional strobo light emitting circuit having a power source E, a generator 41, a main capacitor MC and a strobo discharge lamp 42 is generally indicated at numeral 40. A control circuit 50 comprising an FET 51, a transistor 52 and said coil 31 is coupled to the strobo light emitting circuit 40. Between the coil 31 and the positive pole of the power source E is provided a switch 53 which is associated with said change-over button 26. The switch 53 is closed when the button 26 is slid in the ON position for flashlight photography. The coil 31 is also connected to the collector 52a of the transistor 52. The drain 51a of the FET 51 and the base 52b of the transistor 52 are connected with each other. A connecting point X between the drain 51a and the base 52b is connected to a connecting point Y between said coil 31 and said switch 53 by way of a line 54. As will be apparent from FIG. 2, the FET 51 is held in a conductive state when the main capacitor MC is not completely charged so that the electric current flows through the FET 51. Accordingly, the base current of the transistor 52 does not flow through the transistor 52. Therefore, said coil 31 is not supplied with an electric current.

When the charge stored in the main capacitor MC has reached the required level, FET 51 is cut off to cause a base current to flow through the transistor 52 by way of the line 54. Accordingly, the transistor 52 becomes conductive to cause a current to flow through the coil 31.

As described hereinbefore, the permanent magnet 30 attracts the Y-shaped lever and holds it in the position where the Y-shaped lever 10 allows the shutter lock lever 20 to rotate in the clockwise direction to prevent the depression of the shutter lever 2 when the coil 31 is not supplied with an electric current. Thus the shutter release button 2b cannot be depressed, until the charge stored in the main capacitor MC reaches the required level.

On the other hand, the permanent magnet 30 is nullified to allow the Y-shaped lever 10 to rotate in the clockwise direction to push the shutter lock lever 20 when the coil 31 is supplied with an electric current. Upon clockwise rotation of the Y-shaped lever 10, the shutter lock lever 20 is rotated in the counterclockwise direction so that the engagement between the engaging portion 22a of the shutter lock lever 20 and the engaging portion 2a of the shutter lever 2 is released to allow the depression of the shutter release button 2b. Thus the shutter release button 2b can be depressed when the charge stored in the main capacitor MC has reached the required level.

Upon depression of the shutter release button 2b, the main capacitor MC is discharged to flash a strobo discharge lamp 42 by way of a trigger switch 43. Accordingly, the level of the charge stored in the main capacitor MC is lowered. Therefore, the electric current supplied to the winding 31 is cut off again and the permanent magnet 30 recovers the magnetic force thereof. Then the shutter lock means of this embodiment is reset by the wind-up movement of the film wind up lever 3, as described above.

In the above described embodiment of the invention, as the electromagnetic means is employed a combination of an electromagnetic coil and a permanent magnet which holds the mechanical locking means in the lock position where the mechanical locking means prevents depression of the shutter release button by the attractive force thereof when the strobo capacitor is not charged up to the required level, and is nullified to release the mechanical locking means when the capacitor is completely charged so that the depression of the shutter release button is allowed. However, an electromagnet may be used in place of the combination of an electromagnetic coil and a permanent magnet. In this case, the electromagnet is energized to attract the first arm 11 of the Y-shaped lever 10 until the capacitor is completely charged, and is deenergized when the charge stored in the capacitor has reached the required level. Otherwise, the electromagnet may be energized to release the engagement between the mechanical locking means and the shutter release button by an attractive force thereof. In both cases, the control circuit has to be modified to some extent. Since such modification is not so difficult to those skilled in the art, it will not be described here.

The control circuit 50 serves to supply the coil 31 with the electric current until the charge stored in the capacitor reaches the required level and to cut off supply of power when the charge has reached the required level. Therefore, the control circuit is not limited to one as shown in FIG. 2. For example, a thyristor may be used in place of the FET 51.

Figure 2:
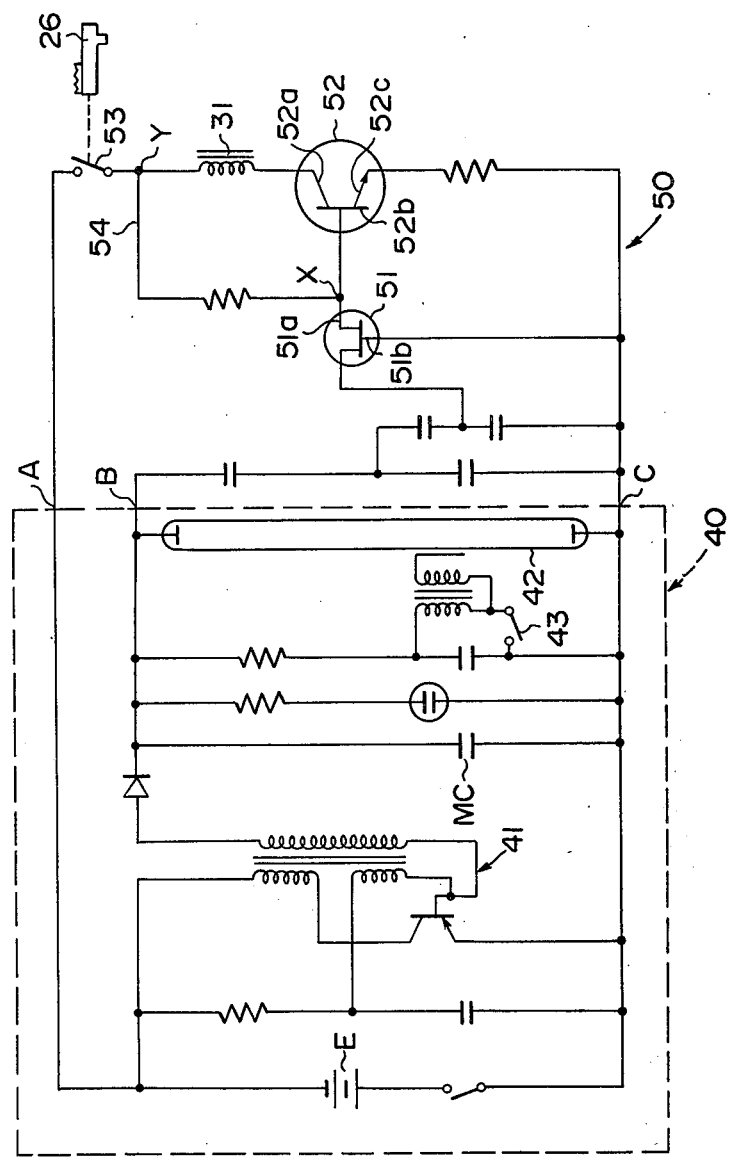
FIG. 2 shows a wiring diagram of a typical control circuit employed in a shutter lock means of the present invention.

In case a strobo is attached to the camera body, the control circuit 50 and the mechanical locking means are provided within the camera body and three pairs of contacts for points A, B and C shown in FIG. 2 are connected with each other each pair of which is brought in contact with each other when the strobo is attached to the camera body. In this case, said coil 31 may be supplied with power from a power source provided in the camera body such as a power source for an automatic exposure control system whereby said pair of contacts for point A can be eliminated.

Now another embodiment of the present invention will be described with reference to FIG. 3. In a shutter mechanism of this invention, shutter release is prevented when shooting condition is not proper. Further, a solenoid controls the shutter mechanism so that an exposure time determined by an automatic exposure control circuit is obtained. The shutter mechanism and the solenoid are used as a mechanical locking means and an electromagnetic lock releasing means, respectively in this embodiment, in accordance with the present invention.

Figure 3:
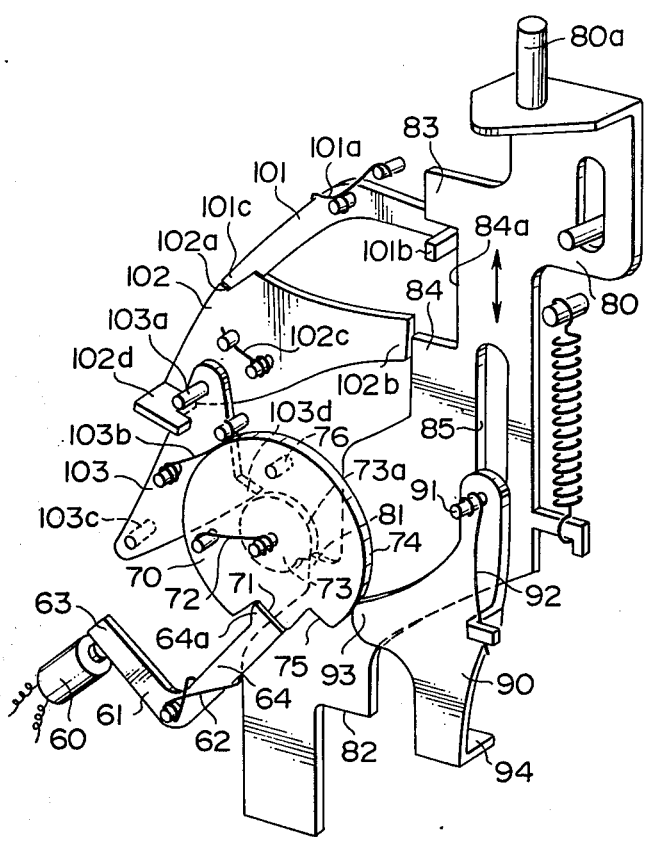
FIG. 3 is a perspective view showing another example of the mechanical locking means employed in a shutter lock means in accordance with another embodiment of the present invention.

In FIG. 3, is indicated with a numeral 60 a solenoid which is controlled by an automatic exposure control circuit (not shown). When shooting condition is not proper, the solenoid 60 is not energized and depression of a shutter release button 80a is prevented as will be described hereinbelow. When the shooting condition is proper, the solenoid 60 is supplied with an electric current to allow the depression of the shutter release button 80a to open the shutter. When a time interval determined by the automatic exposure control circuit has lapsed, the solenoid 60 is deenergized to close the shutter.

An L-shaped lever 61 having first and second arms 63 and 64 is pivotably mounted in a camera body. The L-shaped lever 61 is urged in the counterclockwise direction by a spring 62 and the first arm 63 thereof is in contact with said solenoid 60. The second arm 64 of the L-shaped lever 61 has a hook portion 64a. The hook portion 64a is engaged with a first cut-off portion 71 of a disk member 70 which is rotatably mounted in the camera body and also urged in the counterclockwise direction by a spring 72. The disk member 70 has a cam 73 fixed thereto coaxially therewith. The periphery 73a of the cam 73 abuts against a first projection 81 of a shutter release member 80 which moves up and down. The shutter release member 80 has a shutter release button 80a on the top thereof. The force of the spring 72 urging the disk member 70 counterclockwise is stronger than that of the spring 62 which urges said L-shaped lever 61 counterclockwise. However, a rotation of the disk member 70 is prevented by the abutment between the periphery 73a of the cam 73 and the first projection 81 of the shutter release member 80.

Against the periphery 74 of the disk member 70 abuts an edge portion 93 of a lock lever 90 for preventing a downward movement of the shutter release member 80. The lock lever 90 is pivotably supported on a pivot 91 wich extends through an elongated slot 85 provided in the shutter release member 80, and is urged by a spring 92 in the clockwise direction. The lever 90 is prevented from swinging in the clockwise direction by abutment between the periphery 74 of the disk member 70 and an edge portion 93 thereof. Further, the lock lever 90 has a hook portion 94 which engages a cut-off portion 82 of the shutter release member 80 to prevent depression of the shutter release member 80 when the lever 90 swings in the clockwise direction.

When the shutter release button 80a is depressed and the shutter release member 80 is moved downward, the first projection 81 of the shutter release member 80 is disengaged from the periphery 73a of the cam 73 on the disk member 70. When said solenoid 60 is not energized, therefore, the disk member 70 is rotated in the counterclockwise direction pushing the L-shaped lever 61 in the clockwise direction overcoming the force of the spring 62 by the force of the spring 72, since the force of the latter is stronger than that of the former. When the disk member 70 rotates in the counterclockwise direction, the edge portion 93 of the lever 90 slips along the periphery 74 of the disk member 70 to fall in a second cut-off portion 75 formed on the disk member 70. Thus the lever 90 is allowed to swing in the clockwise direction and the hook portion 94 thereof is brought in engagement with the cut-off portion 82 of the shutter release member 80 to prevent further downward movement thereof. Therefore, the shutter of the camera cannot be released.

When said solenoid 60 is energized, the solenoid 60 attracts the first arm 63 of the L-shaped lever 61 overcoming the force of the spring 72. Accordingly, even if the first projection 81 of the shutter release member 80 is disengaged from the periphery 73a of the cam 73 upon a downward movement of the lever 80, the disk member 70 is not able to rotate and is held in its position. Therefore, the lever 90 also does not swing. Thus, the shutter release member 80 is able to move further downward.

The shutter release member 80 is provided with a second projection 83, which, upon further downward movement of the member 80, pushes down an edge portion 101b of a lever 101 to rotate it in the clockwise direction. The lever 101 is pivotably mounted in the camera body and urged in the counterclockwise direction by a spring 101a. An engaging end 101c of the lever 101 is engaged with a corresponding engaging sholder 102a of a lever 102. The lever 102 is rotatably provided and urged in the clockwise direction with a spring 102c. One end 102b of the lever 102 abuts against a side edge 84 of the shutter release member 80, and the other end 102d thereof is engaged with a pin 103a secured on a shutter blade operating member 103 to prevent counterclockwise rotation thereof. When the shutter release member 80 further moves downward, the lever 101 is rotated in the clockwise direction to release the engagement between the engaging end 101c thereof and the engaging shoulder 102a of the lever 102 and the end 102b of the lever 102 falls in a cut-off portion 84a formed on the side edge of the shutter release member 80. Accordingly, said shutter blade operating member 103 is rotated in the counterclockwise direction by the force of a spring 103b.

The shutter blade operating member 103 is generally shaped in triangle. At a first apex thereof is secured said pin 103a and at a second apex thereof is secured a shutter operating pin 103c which opens a shutter of the camera when the shutter blade operating member 103 rotates in the counterclockwise direction and closes the shutter when the member 103 rotates in the clockwise direction. Therefore, the shutter is opened upon further downward movement of the shutter release member 80. The other apex, i.e., a third apex 103d is positioned within the range of rotation of a pin 76 provided on the disk member 70.

In the above mentioned manner, the shutter is opened. Then, the supply of power to said solenoid 60 is cut off when a time interval determined by the automatic exposure control circuit provided in the camera has lapsed since the shutter was opened. Thereby the disk member 70 is rotated in the counterclockwise direction by the force of the spring 72 overcoming the force of the spring 62. Upon rotation of the disk member 70, said pin 76 provided thereon pushes said third apex 103d of the shutter blade operating member 103 to cause it to rotate in the clockwise direction, whereby the shutter is closed by way of the shutter operating pin 103c as mentioned above.

As described above, in the shutter system as shown in FIG. 3, depression of the shutter release button 80a is prevented when said solenoid 60 is not supplied with power and is allowed when said solenoid 60 is energized. Accordingly, the object of the present invention is accomplished by providing a circuit which is selectively connected to the solenoid 60 and supplies thereto an electric current when the charge stored in the capacitor for the strobo has reached the required level. The circuit is connected to the solenoid 60 in place of the automatic exposure control circuit when the camera is set to take a picture using the strobo.

In this embodiment, the shutter system in an automatic exposure control camera is commonly used as the electromagnetic lock releasing means and the mechanical lock means of the present invention. Therefore, the number of elements required in the shutter lock means of the present invention is reduced in this embodiment.

We claim:

1. A shutter lock means for a photographic camera with a strobo flash light device which prevents shutter release until the charge stored in a strobo capacitor reaches a required level to flash a strobo discharge lamp comprising an electromagnetic lock releasing means including an electromagnet which is to be in two conditions, in one of said conditions the electromagnet being magnetized and in the other demagnetized, said electromagnetic lock releasing means comprising a permanent magnet and an electromagnetic coil wound therearound, said permanent magnet working when said coil is not energized and being nullified when said coil is energized; a mechanical lock means which prevents depression of a shutter release button when said electromagnetic lock releasing means is in one of said two conditions and allows the depression of the shutter release button when said electromagnetic lock releasing means is in the other condition, said mechanical lock means comprising a shutter lock member which is urged to be engaged with a shutter release member to prevent the movement thereof, and a lock release member which is urged toward a first position in which it prevents said engagement between said shutter lock member and said shutter release member, said lock release member being held in a second position by attractive force of said permanent magnet to allow the engagement between said shutter lock member and the shutter release member, said lock release member being brought in contact with said permanent magnet to be held by the attractive force thereof in response to wind-up movement of a film wind-up lever provided on the camera; and a control circuit connected with said electromagnet which selectively supplies to said electromagnet an electric power to cause the electromagnetic lock releasing means to be in one of said two conditions or cuts off supply of the electric power to said electromagnet to cause the electromagnetic lock releasing means to be in the other condition depending on a level of the charge stored in the strobo capacitor, said control circuit supplying to said coil an electric current when the charge stored in the strobo capacitor has reached the required level to flash the strobo discharge lamp.

* * * * *